(12) United States Patent
Mok et al.

(10) Patent No.: US 8,949,245 B2
(45) Date of Patent: Feb. 3, 2015

(54) ENHANCED VIEWS OF TAGGED ITEMS IN A GALLERY

(71) Applicant: Microsoft Corporation, Redmond, WA (US)

(72) Inventors: Kin Hong Mok, Richmond, TX (US); Avijit Sinha, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 105 days.

(21) Appl. No.: 13/661,847

(22) Filed: Oct. 26, 2012

(65) Prior Publication Data

US 2014/0122498 A1    May 1, 2014

(51) Int. Cl.
    *G06F 17/30*    (2006.01)

(52) U.S. Cl.
    USPC .......................................... 707/741

(58) Field of Classification Search
    USPC ............ 707/2, 3, 741; 715/220; 709/204–206
    See application file for complete search history.

(56) References Cited

U.S. PATENT DOCUMENTS

| | | |
|---|---|---|
| 2009/0299725 A1 | 12/2009 | Grigsby et al. |
| 2010/0058163 A1* | 3/2010 | Garcia-Molina et al. ..... 715/220 |
| 2011/0029873 A1 | 2/2011 | Eseanu et al. |
| 2011/0137548 A1 | 6/2011 | Shen et al. |
| 2011/0246942 A1 | 10/2011 | Misawa |
| 2012/0130781 A1 | 5/2012 | Li |
| 2012/0185456 A1 | 7/2012 | Hart et al. |
| 2012/0216117 A1 | 8/2012 | Arriola et al. |

OTHER PUBLICATIONS

Rainer Simon, et al.; "Tag Clouds and Old Maps: Annotations as Linked Spatiotemporal Data in the Cultural Heritage Domain;" Workshop on Linked Spatiotemporal Data 2010, held in conjunction with the 6th International Conference on Geographic Information Science (GIScience 2010); Sep. 14, 2010; pp. 1-12; http://ceur-ws.org/Vol-691/paper2.pdf.

Stefanie Lindstaedt, et al.; "Recommending Tags for Pictures Based on Text, Visual Content and User Context;" In Proceedings of the 2008, Third International Conference on Internet and Web Applications and Services; Jun. 8, 2008; pp. 1-6; http://know-center.tugraz.at/wp-content/uploads/2010/10/2008_slind_ICIW_Sasu.pdf.

James Lockman; "Nested Overlay Conundrum and Solution for DPS;" Feb. 8, 2012; pp. 1-6; Adobe Systems Inc.; http://blogs.adobe.com/jlockman/2012/02/08/nested-overlay-solution-for-dps/.

(Continued)

*Primary Examiner* — Etienne Leroux
(74) *Attorney, Agent, or Firm* — Steve Crocker; Leonard Smith; Micky Minhas (57) ABSTRACT

Disclosed herein are systems, methods, and software for facilitating gallery environments and views. In at least one implementation an initial view is presented of tagged items arranged in tag groups. The tag groups correspond to tags and the tagged items are arranged in the tag groups based on with which of the tags each of the tagged items is associated. One of the groups may be identified for enhanced viewing. Accordingly, tagged items associated with the identified group, by way of their association with a tag corresponding to the group, are identified. In some implementations they may be referred to as enhanced tagged items. An enhanced view may then be presented of at least the enhanced tagged items.

20 Claims, 5 Drawing Sheets

(56) References Cited

OTHER PUBLICATIONS

Daniele Panza, et al.; "Semantic Zoomable Interface for Multimedia Content;" 12th International Workshop on Image Analysis for Multimedia Interactive Services, Delft, Netherlands; Apr. 13, 2011; pp. 1-4; http://www.cs.unibo.it/~marfia/pubblicazioni/c023.pdf.

Stephanie Hertrich; "A Tag Cloud control for Windows Phone 7;" Tagged Content List; Mar. 28, 2011; pp. 1-7; http://blogs.msdn.com/b/stephe/archive/2011/03/28/a-tag-cloud-control-for-windows-phone-7.aspx.

Kirupa; "Deep Zoom Composer Updated: Seadragon Ajax Support, New API, and More;" Expression Blend and Design; Nov. 24, 2008; pp. 1-6; http://blogs.msdn.com/b/expression/archive/2008/11/24/deep-zoom-composer-updated-seajax-support-new-api-and-more.aspx.

International Search Report & Written Opinion for PCT Patent Application No. PCT/US2013/066470, Mailed Date: Feb. 21, 2014, Filed Date: Oct. 24, 2013, 13 Pages.

\* cited by examiner

ENHANCED VIEWS OF TAGGED ITEMS IN A GALLERY

TECHNICAL FIELD

Aspects of the disclosure are related to computer hardware and software technology, and in particular, to galleries for viewing content items.

TECHNICAL BACKGROUND

Gallery applications allow users to manage content, such as photos, videos, documents and other items. A variety of computing environments support gallery applications, such as mobile, desktop, laptop, and tablet computing environments. In fact, gallery applications or similar functionality can also be found on websites, gaming systems, or provided by any other suitable environment.

Items viewed within a gallery can be browsed, shared, and edited, for example. To aid with these tasks, many gallery applications arrange items in a grid chronologically according to when the items were created. Navigating a gallery can involve swiping from one sheet of items in the grid to the next. In addition, it is possible to arrange items in a gallery other than chronologically. For example, some gallery applications provide menu options that allow for items to be grouped according to time and date, location, or people. Custom groups can also be created and items tagged or allocated to the groups on a custom basis. For instance, photos of a particular person may be tagged and viewed together.

In some scenarios, a gallery application presents a main gallery view in which items are arranged on a grid chronologically. Menu options may be available that allow the items to be viewed in a group fashion. By selecting the appropriate menu option, a user can select how to group the items, for example by time, location, or people. Upon selecting the desired group, the items associated with that group are presented. To view a different group, the menu is again navigated and the different group selected for viewing.

OVERVIEW

Provided herein are systems, methods, and software for facilitating gallery environments and views. In at least one implementation an initial view is presented of tagged items arranged in tag groups. The tag groups correspond to tags and the tagged items are arranged in the tag groups based on with which of the tags each of the tagged items is associated. One of the groups may be identified for enhanced viewing. Accordingly, tagged items associated with the identified group, by way of their association with a tag corresponding to the group, are identified. An enhanced view may then be presented of at least the enhanced tagged items.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Implementations described herein provide for improved gallery environments and views. In at least one implementation, an initial view may be presented of tagged items arranged in several tag groups. Each tag group may include multiple tagged items associated with that group and may include some information indicative of its associated tag. For instance, a tag group may involve the presentation of multiple items in the group along with a visual or graphical representation of its associated tag, such as a title bar. The items may be presented within each view in a variety of formats, for example as thumbnail graphics, reduced size images, bitmap images, icons, text representations, or any other suitable format.

In operation, a user may desire to view an enhanced view of one of the groups in a gallery, such as a photo gallery, document gallery, or any other kind of gallery. Accordingly, tagged items associated with the group of interest, sometimes referred to herein as enhanced tagged items, are identified. These enhanced tagged items can be presented by way of an enhanced view, thereby providing the user with an improved view of at least some of the tagged items relative to that provided by way of the initial view. In some scenarios, the enhanced view may be an entirely new sheet or grid of items that replace the initial view. In other scenarios, the enhanced view may be presented simultaneously with at least a portion of the initial view. In a situation where groups in an initial view are presented in rows, items associated with each group may occupy the row corresponding to the group. The enhanced view may involve scrolling horizontally through one of the rows while the remaining rows remain stationary in order to reveal or otherwise render visible additional items in the group.

Tagging items may occur in a variety of ways and can be accomplished automatically, manually, or otherwise. For example, a collection of photos may be tagged based on a location, in which case the items may be arranged in groups according to their respective locations. Other examples of tags include the identity of people in photos, time and date associated with photo or productivity documents, topics associated with productivity documents, author identifies, time and date of document creation, or any other identifying information that may be useful to apply as a tag.

A gallery may be arranged in an initial view based one or more of the tags. For instance, a gallery may be arranged in location groups, but each location group may include one or more sub-groups pertaining again to location but possibly to some other category or other identifying information. In some cases the initial view may be considered a main view of items in a gallery, such as the main view presented upon launching a gallery application, although it may be possible to navigate to the main view at other times during operation of a gallery application.

Upon selecting one of the groups, such as by touching a visual or graphical representation of a tag that defines a group, swiping an area associated with a group, or providing some other suitable user input, items are identified for an enhanced view. The graphical representation of a tag may be presented in a variety of ways, such as above, below, next to, or overlayed upon a group of items with which the tag is associated. Referring to the example above involving photos tagged by a location, a group of photos associated with a particular city may be presented in an initial view, along with other groups of photos associated with other cities. By selecting the group associated with the particular city, an enhanced view of the group may be launched. The enhanced view may include another item or items in addition to those presented in the initial view. For instance, if the group as initially presented included a view of three photos, the enhanced view may include a view of four or more photos associated with that particular city.

Some aspects may be apparent from the implementations disclosed herein. By arranging items in tagged groups and allowing for navigation via the tagged groups, it may be easier to find items among a large collection of items. For example, a user can zoom into a particular group of sub-group to locate a file or photo rather than having to scroll through an entire collection of files or photos. In another aspect, additional context may be provided with respect to any given tag group by presenting at least a portion of the items in the group in an initial view, possibly in addition to a tag. These and other aspects may improve the ease of use of a gallery, as well has possibly improve the operating of an underlying device.

Figure 1:
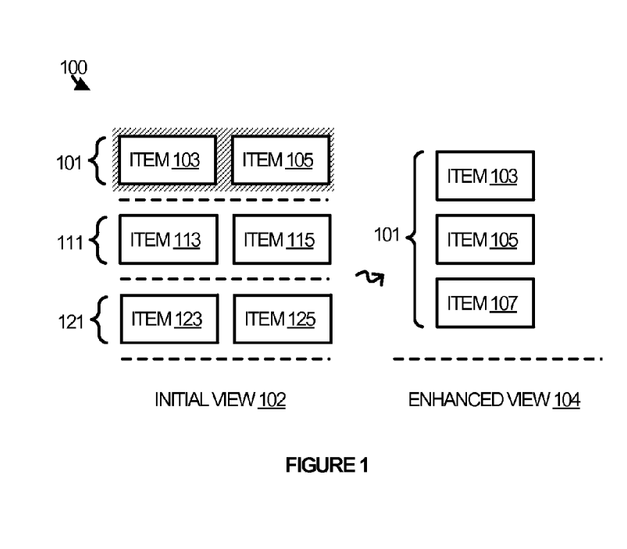
FIG. 1 illustrates a gallery environment in an implementation.
Figure 2:
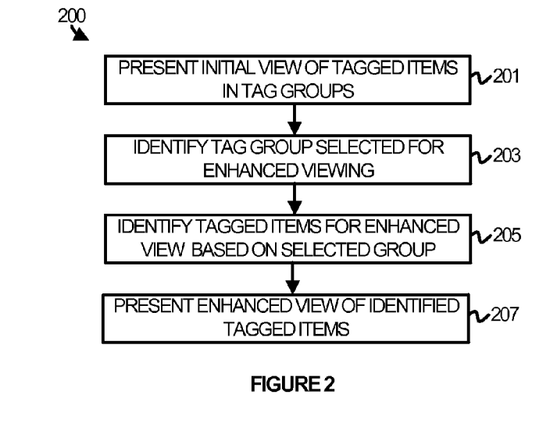
FIG. 2 illustrates a gallery process in an implementation.
Figure 3:
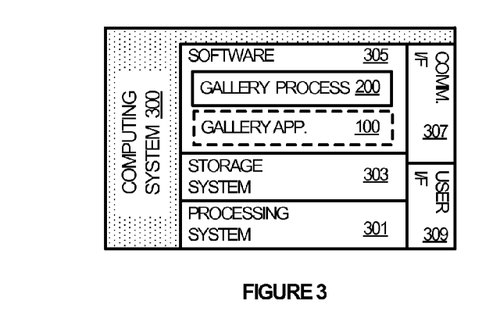
FIG. 3 illustrates a computing system in an implementation.

Referring now to the drawings, FIG. 1 illustrates a gallery environment that may be rendered when implementing a gallery process, as illustrated in FIG. 2. FIG. 3 illustrates a computing system suitable for implementing the gallery process and rendering the gallery environment. FIGS. 4-7 illustrate various operational scenarios involving gallery environments in several implementations.

Turning to FIG. 1, gallery environment 100 is illustrated in an implementation. Gallery environment 100 may be rendered when gallery process 200, described in more detail with respect to FIG. 2, is implemented by computing system 300 when executing various software applications or components, such as application program or operating system components. Gallery environment 100 may itself also include various software elements or components to facilitate the rendering of such views.

Gallery environment 100 may be any environment within which views of items may be rendered and displayed. For example, gallery environment 100 includes an initial view 102 of several groups of tagged items arranged in the groups based on with which tag of several tags each of the items are associated. Gallery environment 100 also includes an enhanced view 104 of one of the groups presented in the initial view 104 that may be selected for enhanced viewing. The items in the enhanced group are associated with the tag corresponding to the group selected for enhanced viewing. Note that the presentation of initial view 102 may occur prior to the presentation of enhanced view 104. In some scenarios, enhanced view 104 may replace initial 102, although it may be possible to present all or portions of both initial view 102 and enhanced view 104 at the same time.

In particular, initial view 102 includes tag groups 101, 111, and 121. Tag group 101 includes item 103 and item 105. Item 103 and item 105 may be included in tag group 101 because both are tagged with the same or a similar tag. As an example, item 103 and item 105 may be tagged as being photos of the same person or location or documents pertaining to the same topic. Tag group 111 includes item 113 and item 115. Item 113 and item 115 may be included in tag group 111 because both are tagged with the same or a similar tag. As an example, item 113 and item 115 may be tagged as being photos of the same person or location or documents pertaining to the same topic. Tag group 121 includes item 123 and item 125. Item 123 and item 125 may be included in tag group 121 because both are tagged with the same or a similar tag. As an example, item 123 and item 125 may be tagged as being photos of the same person or location or documents pertaining to the same topic. While location, people, and topics are some examples of tags, a variety of tags are possible and are not limited to just those disclosed herein.

In operation, gallery process 200 may be employed when rendering gallery environment 100. To begin, initial view 102 may be presented for viewing to a user, including a view of tagged items arranged in groups based on their respective tags (step 201). As discussed above, initial view 102 includes tag groups 101, 111, and 121, and items 103, 105, 113, 115, 123, and 125. The items included in the tag groups in initial view 102 are presented merely for exemplary purposes. More or fewer items may be presented. For example, it may be possible to display three or four or more items in each group. Note also that more items may belong to each group than just those presented in initial view 102.

A tag group may then be identified for enhanced viewing (step 203). Identifying the tag group may occur in response to a user input, such as a gesture, mouse click, or some other user input. Input information corresponding to the user input can be processed to identify which group was selected from tag groups 101, 111, and 121. It is assumed for exemplary purposes that tag group 101 was been selected, as indicated by its shaded background.

Next, tagged items are identified for presentation in an enhanced view based on which tagged group was selected (step 205). As mentioned above, each tagged group may include more tagged items than just those presented via initial view 102. Thus, upon selection of one of tagged groups 101, 111, and 121, it can be determined which tag (not shown) corresponds to the selected group. From this determination, it can then be determined which tagged items are associated with the corresponding tag. Those tagged items, or at least a portion of them, may then be presented via enhanced view 104. In some scenarios, they may be referred to as enhanced tagged items since they will be presented in the enhanced view 104. In some scenarios, the tagged items presented in initial view 102 may be referred to as initial tagged items.

In this example, tagged group 101 is selected. Thus, a look-up or other similar determination is performed to determine which items are associated with the tag corresponding to tagged group 101. Those items, or at least a portion of them, may then be presented in enhanced view 104. Having identified the relevant items, enhanced view 104 may be presented (step 207). In this example, the enhanced tagged items included in enhanced view 104 include item 103, item 105, and item 107. Item 107 was not presented in tagged group 101 within initial view 102, demonstrating that an enhanced group of tagged items may include more items then those in a corresponding initial group of items.

In fact, such a result may occur frequently when groups include a sufficient number of items such that presenting all of them within an initial view may not be practical or otherwise desired. For example, several tagged groups may correspond to various locations of where photos were taken. One group corresponding to one location may include dozens or hundreds of photos, or even more. In such a scenario, it may be impractical or even impossible to display the dozens or hundreds of items in a tagged group all within an initial view. Rather, by selecting that particular tagged group, an enhanced view of the tagged group may be presented showing additional ones of the items in the group not shown in the initial view.

While gallery process 200 generally refers to presenting an initial view, identifying a tagged group selected for enhanced viewing, identifying enhanced tagged items, and presenting an enhanced view, variations of gallery process 200 are possible. For example, a variation of gallery process 200 may involve initiating each of the aforementioned steps, in addition to or in place of actually performing each of the aforementioned steps. For example, a variation of gallery process 200 may include some or all of initiating the presentation of an initial view, initiating the identification of a tagged group, initiating the identification of enhanced tagged items, and initiating the presentation of an enhanced view.

Computing system 300, referred to in FIG. 3, may be representative of any computing apparatus, system, or systems on which gallery process 200 or variations thereof may be suitably implemented. Optionally, computing system 300 may also be suitable for implementing all of or portions of gallery environment 100. Implementing gallery process 200 or variations thereof may include local execution, streaming execution, or hosted execution of gallery process 200, or any hybrid combination or variation thereof. Examples of computing system 300 include mobile computing devices, desktop computers, cell phones, tablet computers, laptop computers, notebook computers, media devices, and gaming devices, as well as any other type of mobile computing devices and any combination or variation thereof. Examples of computing system 300 also include server computers, cloud computing platforms, and virtual machines, as well as any other type of computing system, variation, or combination thereof.

Computing system 300 includes processing system 301, storage system 303, software 305, communication interface 307, and user interface 309. In some implementations, user interface 309 may be omitted. Processing system 301 is operatively coupled with storage system 303, communication interface 307, and user interface 309. Processing system 301 loads and executes software 305 from storage system 303. When executed by computing system 300 in general, and processing system 301 in particular, software 305 directs computing system 300 to operate as described herein for gallery process 200 or variations thereof. Computing system 300 may optionally include additional devices, features, or functionality not discussed here for purposes of brevity.

Referring still to FIG. 3, processing system 301 may comprise a microprocessor and other circuitry that retrieves and executes software 305 from storage system 303. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device, combinations, or variations thereof.

Storage system 303 may comprise any computer readable storage media readable by processing system 301 and capable of storing software 305. Storage system 303 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal. In addition to storage media, in some implementations storage system 303 may also include communication media over which software 305 may be communicated. Storage system 303 may be implemented as a single storage device but may also be implemented across multiple storage devices or sub-systems co-located or distributed relative to each other. Storage system 303 may comprise additional elements, such as a controller, capable of communicating with processing system 301.

Software 305 may be implemented in program instructions and among other functions may, when executed by computing system 300 in general or processing system 301 in particular, direct computing system 300 or processing system 301 to present an initial view of at least a plurality of tagged items arranged in a plurality of tag groups, corresponding to a plurality of tags, based on with which of the plurality of tags each of the plurality of tagged items is associated, identify an enhanced plurality of tagged items to present based at least in part on to which of the plurality of tags a tag group, identified from the plurality of tag groups for enhanced viewing, corresponds, and present an enhanced view of at least the enhanced plurality of tagged items. Software 305 may include additional processes, programs, or components, such as operating system software or other application software. Software 305 may also comprise firmware or some other form of machine-readable processing instructions executable by processing system 301.

In general, software 305 may, when loaded into processing system 301 and executed, transform computing system 300 overall from a general-purpose computing system into a special-purpose computing system customized to facilitate gallery views as described herein for each implementation. Indeed, encoding software 305 on storage system 303 may transform the physical structure of storage system 303. The specific transformation of the physical structure may depend on various factors in different implementations of this description. Examples of such factors may include, but are not limited to the technology used to implement the storage media of storage system 303 and whether the computer-storage media are characterized as primary or secondary storage.

For example, if the computer-storage media are implemented as semiconductor-based memory, software 305 may transform the physical state of the semiconductor memory when the program is encoded therein. For example, software 305 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 300 is generally intended to represent a computing system with which software 305 is deployed and executed in order to implement gallery process 200 (and variations thereof) and optionally all or portions of gallery environment 100. However, computing system 300 may also represent any computing system on which software 305 may be staged and from where software 305 may be distributed, transported, downloaded, or otherwise provided to yet another computing system for deployment and execution, or yet additional distribution.

Referring again to FIG. 1, through the operation of computing system 300 employing software 305, transformations may be performed with respect to gallery environment 100.

As an example, gallery environment 100 could be considered transformed from one state to another when subject to gallery process 200 or variations thereof. In a first state, computing system 300 may render initial view 102 in gallery view 102. Upon a selection of one of the groups 101, 111, and 121 in initial view 102, gallery environment 100 may in a second state include a presentation of enhanced view 104.

Referring again to FIG. 3, communication interface 307 may include communication connections and devices that allow for communication between computing system 300 and other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface 309 may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 309. The aforementioned user input devices are well known in the art and need not be discussed at length here. User interface 309 may also include associated user interface software executable by processing system 301 in support of the various user input and output devices discussed above. Separately or in conjunction with each other and other hardware and software elements, the user interface software and devices may provide a graphical user interface, a natural user interface, or any other kind of user interface.

Figure 4:
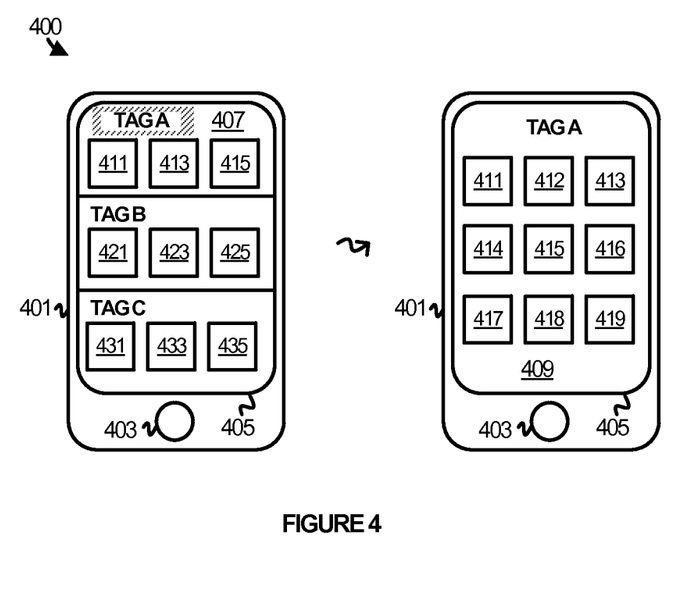
FIG. 4 illustrates a gallery scenario in an implementation.

FIG. 4 illustrates gallery scenario 400 in an implementation involving mobile phone 401. Gallery scenario 400 may apply as well to any other type of computing device, such as a tablet device, laptop computer, desktop computer, or the like. In this scenario, mobile phone 401 includes control element 403 and display 405. Mobile phone 401 may include additional elements that are not illustrated here for purposes of clarity. In gallery scenario 400, mobile phone 401 may execute a gallery application or interface with a remote gallery application (such as one hosted on a website) capable of producing gallery views, such as initial view 407 and enhanced view 409.

Initial view 407 is presented by way of display 405 and includes views of several groups associated with several tags. The items in presented in enhanced view 409 are associated with the tag corresponding to a group selected from initial view 407 for enhanced viewing. The presentation of initial view 407 may occur prior to the presentation of enhanced view 409. In some scenarios, enhanced view 407 may replace initial 409, although it may be possible to present all or portions of initial view 407 and enhanced view 409 at the same time.

In initial view 407, items 411, 413, and 415 associated with tag A are presented as a group; items 421, 423, and 425 associated with tag B are presented as another group; and items 431, 433, and 435 associated with tag C are presented as yet another group. The items presented in groups along with tags A, B, and C are done so because they are each associated with at least one or another of the tags. The tags may be automatically associated with the items or a manual association may be made. The order in which the groups are presented may be determined randomly, alphabetically based on the spelling of each tag, by the quantity of items included in each group, or by any other suitable criteria.

As an example, items 411, 413, and 415 may be photos corresponding to the same or a similar location, or documents pertaining to the same or similar topic, generically represented by tag A. Likewise, items 421, 423, and 425 may be photos corresponding to the same or a similar location, or documents pertaining to the same or similar topic, generically represented by tag B. Items 431, 433, and 435 may be photos corresponding to the same or a similar location, or documents pertaining to the same topic, as represented by tag C.

While location, people, and topics are some examples of tags, a variety of tags are possible and are not limited to just those disclosed herein. Moreover, the items included in the tag groups in initial view 407 are presented merely for exemplary purposes. More or fewer items may be presented. For example, it may be possible to display two or four items in each group. More items may belong to each group than just those presented herein.

Continuing with gallery scenario 400, in operation a user may desire to view an enhanced view of one of the groups presented via initial view 407. Accordingly, the user may provide a user input, such as a gesture, mouse click, or some other form of user input, indicative of a group of interest. The user input may correspond to a specific area on display 405, such as space corresponding to a graphic associated with a tag. Tags A, B, and C may each be presented as a selectable graphic, selectable text such as a title bar, or overlayed text, allowing the user to identify which group is of interest for enhanced viewing. It is assumed here for exemplary purposes that tag A is selected, as indicated by the shading behind tag A.

Next, tagged items are identified for presentation in an enhanced view based on which tagged group was selected. As mentioned above, each tagged group may include more tagged items than just those presented via initial view 407. Thus, upon selection of one of the tagged groups corresponding to tags A, B, and C, it can be determined which tag corresponds to the selected group. From this determination, it can then be determined which tagged items are associated with the corresponding tag. Those tagged items, or at least a portion of them, may then be presented via enhanced view 409.

In this example, the tagged group associated with tag A. Thus, a look-up or other similar determination is performed to determine which items are associated with tag A. Those items, or at least a portion of them, may then be presented in enhanced view 409. Having identified the relevant items, enhanced view 409 is presented. In this example, the enhanced tagged items included in enhanced view 409 include items 411-419. Items 412, 414, and 416-419 were not presented within initial view 407, thereby again demonstrating that an enhanced group of tagged items may include more items then those presented in a corresponding initial group of items.

Figure 5:
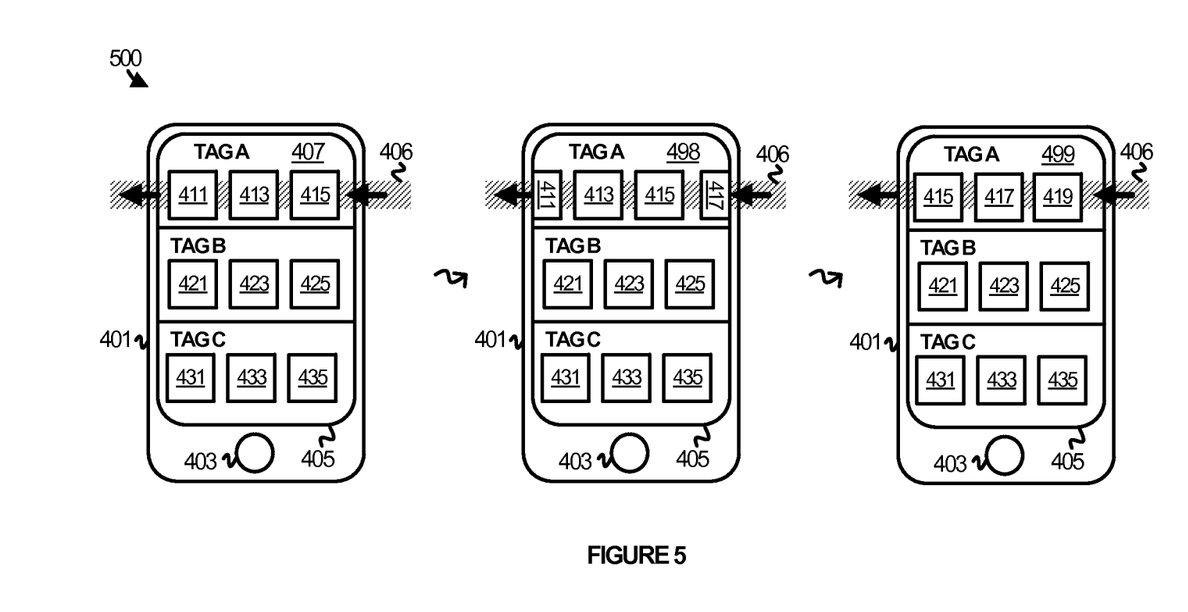
FIG. 5 illustrates a gallery scenario in an implementation.

Referring now to FIG. 5, gallery scenario 500 is illustrated. Gallery scenario 500 is similar to gallery scenario 400 in that it involves the operation of mobile phone 401. However, in gallery scenario 500, the presentation of an enhanced view occurs differently than in gallery scenario 400. Gallery scenario 500 may apply as well to any other type of computing device, such as a tablet device, laptop computer, desktop computer, or the like.

Continuing with gallery scenario 500, in operation a user may desire to view an enhanced view of one of the groups presented via initial view 407. Accordingly, the user may provide a user input, such as a gesture, mouse click, or some other form of user input, indicative of a group of interest. In gallery scenario 500, tagged items are identified for presentation in an enhanced view by way of a swipe gesture 406. As mentioned above, each tagged group may include more tagged items than just those presented via initial view 407. Thus, swipe gesture 406 functions to shift which items are displayed with respect to a group of interest. A horizontal shift corresponding to the direction of the swipe can be rendered with respect to the items in the group of interest.

In this example, swipe gesture 406 corresponds to the group of items associated with tag A. Upon the swipe occurring, it can be determined that the swipe corresponds to tag A. From this determination, it can then be determined which tagged items are associated with the corresponding tag. Those tagged items, or at least a portion of them, may then be presented via an enhanced view. A swipe gesture may result in sliding or shifting animation, sometimes referred to as a scroll, of the items associated with tag A. Thus, two enhanced views 498 and 499 are provided that are illustrative of views that may be encountered while such scrolling animation is implemented. In this example, the enhanced tagged items included in enhanced view 498 include partial views of items 411 and 417 and full views of items 413 and 415. As swipe gesture 406 persists, other items come into view. Thus, enhanced view 499 includes items 415, 417, and 419.

Note that while scrolling is effected with respect to tag A, the items presented along with tags B and C remain stationary. This allows a user to scroll through items one roll at a time, rather than having to navigate items on a per-sheet or per-page basis. Such a configuration may possibly allow for simultaneous viewing of multiple groups, or substantially simultaneous viewing of multiple groups.

Figure 6:
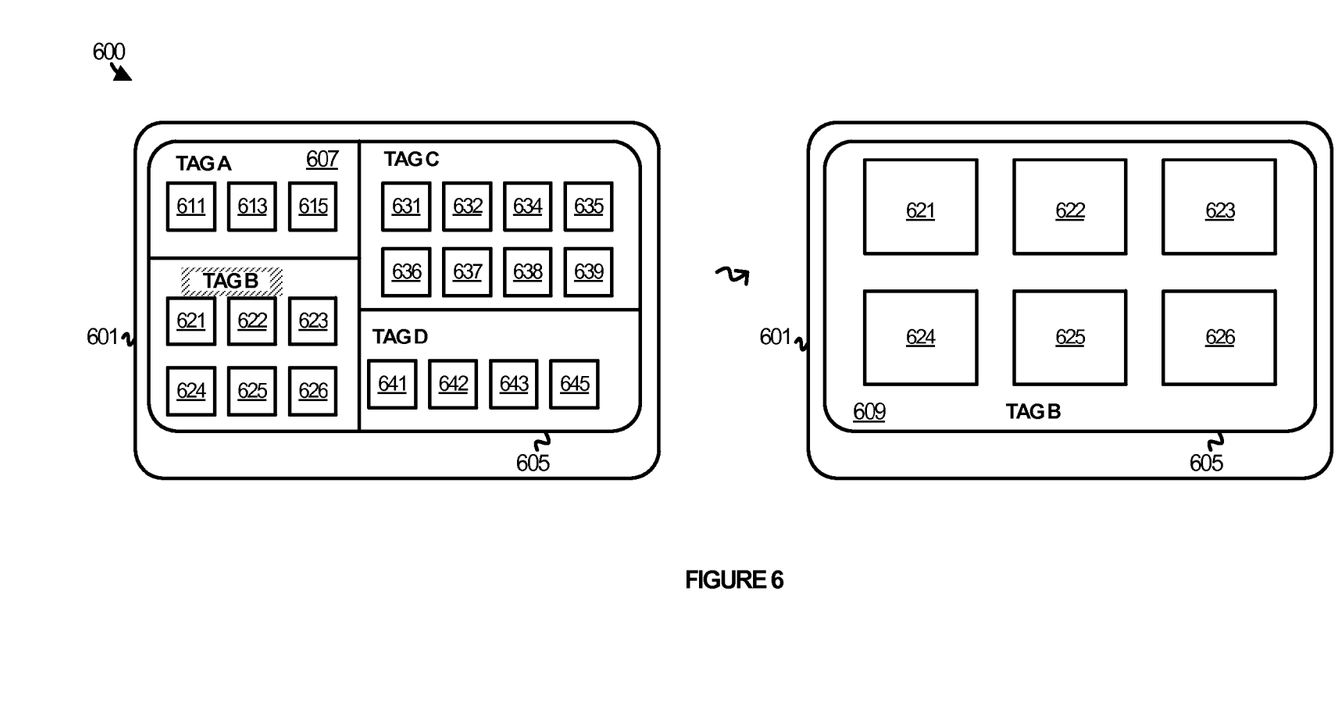
FIG. 6 illustrates a gallery scenario in an implementation.

FIG. 6 illustrates another gallery scenario 600, but this time with respect to a tablet device 601. Gallery scenario 600 may apply as well to any other type of computing device, such as a mobile phone, laptop computer, desktop computer, or the like.

In this scenario, tablet device 601 display 605. Tablet device 601 may include additional elements that are not illustrated here for purposes of clarity. In gallery scenario 600, tablet device 601 may execute a gallery application or interface with a remote gallery application (such as one hosted on a website) capable of producing gallery views, such as initial view 607 and enhanced view 609.

Initial view 607 is presented by way of display 605 and includes views of several groups associated with several tags. The items presented in enhanced view 609 are associated with the tag corresponding to a group selected from initial view 607 for enhanced viewing. The presentation of initial view 607 may occur prior to the presentation of enhanced view 609. In some scenarios, enhanced view 607 may replace initial 609, although it may be possible to present all or portions of initial view 607 and enhanced view 609 at the same time.

In gallery scenario 600, the presentation of initial view 607 includes display spaces allocated to the tag groups in a roughly proportional manner corresponding to a ratio of the number of items in each group to the sum of all of the items displayed. For example, the display space allocated to tag A, which includes just three items, is smaller than the display spaces allocated to the other groups. The display space allocated to tag C is greater than any other display space because tag C is associated with the greatest number of items in initial view 607. Similarly, the display spaces allocated to tag B and tag D are larger than that allocated to tag A, but smaller than that allocated to tag C.

In initial view 607, items 611, 613, and 615 associated with tag A are presented as a group; items 621-626 associated with tag B are presented as another group; items 631-639 associated with tag C are presented as another group; and items 641-645 associated with tag D are presented as yet another group. The items presented in groups along with tags A, B, C, and D are presented as such because they are each associated with at least one or another of the tags. The tags may be automatically associated with the items or a manual association may be made.

As an example, items 611, 613, and 615 may be photos corresponding to the same or a similar location, or documents pertaining to the same or similar topic, generically represented by tag A. Likewise, items 621-626 may be photos corresponding to the same or a similar location, or documents pertaining to the same or similar topic, generically represented by tag B. Items 631-639 may be photos corresponding to the same or a similar location, or documents pertaining to the same or similar topic, as represented by tag C, while items 641-645 may be photos corresponding to a location, or documents pertaining to a topic, as generically represented by tag D. While location, people, and topics are some examples of tags, a variety of tags are possible and are not limited to just those disclosed herein. In addition, the items included in the tag groups in initial view 607 are presented merely for exemplary purposes. More or fewer items may be presented and more items may belong to each group than just those presented in initial view 607.

Continuing with gallery scenario 600, in operation a user may desire to view an enhanced view of one of the groups presented via initial view 607. Accordingly, the user may provide a user input, such as a gesture, mouse click, or some other form of user input, indicative of a group of interest. The user input may correspond to a specific area on display 605, such as space corresponding to a graphic associated with a tag. Tags A, B, C, and D may each be presented as a selectable graphic, selectable text, overlayed, text, or some other suitable representation of a tag allowing the user to identify which group is of interest for enhanced viewing. It is assumed here for exemplary purposes that tag B is selected, as indicated by the shading behind tag B.

Next, tagged items are identified for presentation in an enhanced view based on which tagged group was selected. Upon selection of one of the tagged groups corresponding to tags A, B, C, and D, it can be determined which tag corresponds to the selected group. From this determination, it can then be determined which tagged items are associated with the corresponding tag. Those tagged items, or at least a portion of them, may then be presented via enhanced view 609.

In this example, the tagged group associated with tag B is identified. Thus, a look-up or other similar determination is performed to determine which items are associated with tag B. Those items, or at least a portion of them, may then be presented in enhanced view 609. In this example, the enhanced tagged items included in enhanced view 609 include items 621-626.

Figure 7:
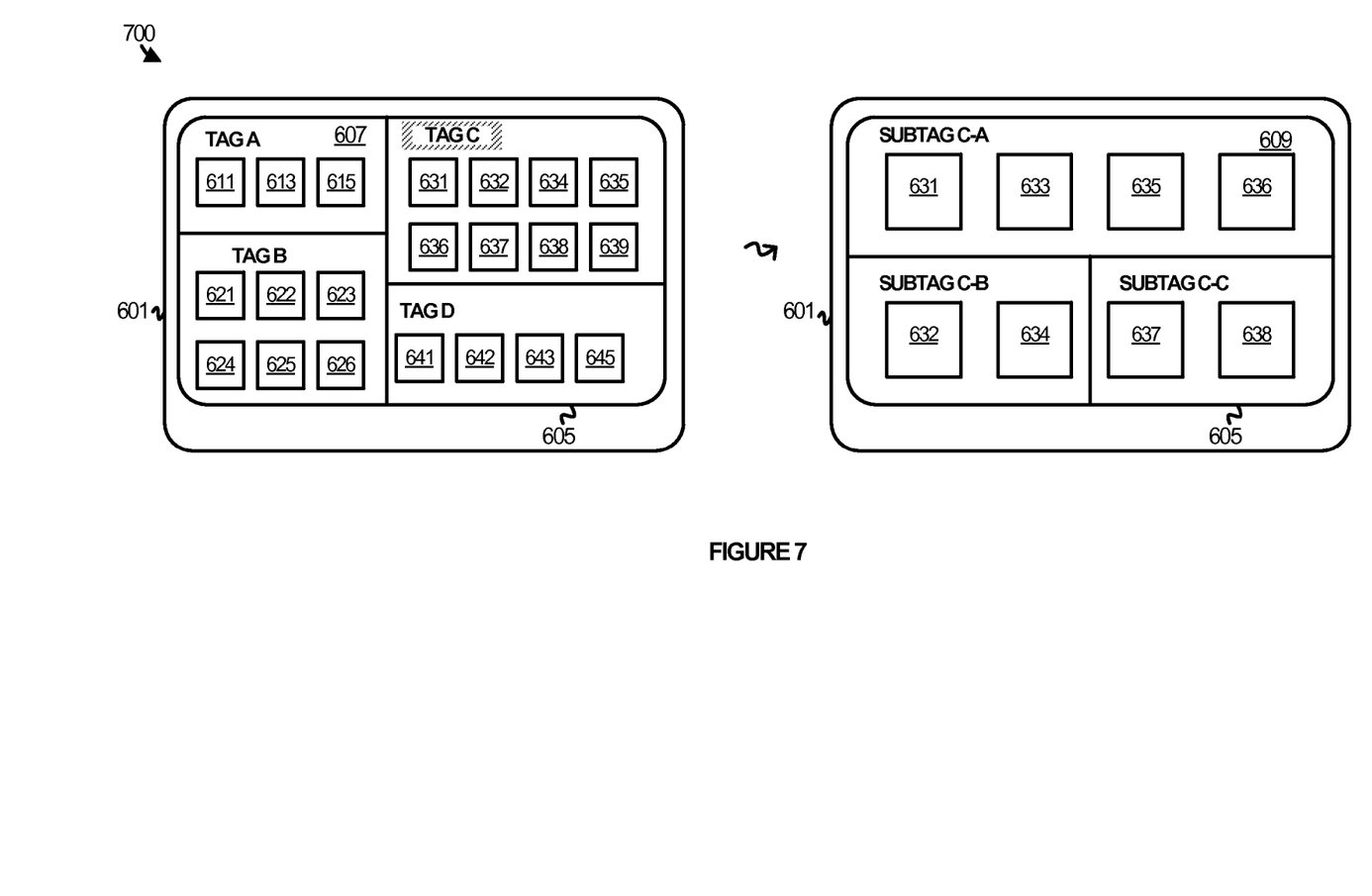
FIG. 7 illustrates a gallery scenario in an implementation.

FIG. 7 illustrates another gallery scenario 700 in an implementation. Gallery scenario 700 also involves tablet device 601, but differs from gallery scenario 600 in that a tag is selected having sub-tags. In particular, tag C is selected from initial view 607. As illustrated, tag C is associated with several sub-tags C-A, C-B, and C-D. Accordingly, enhanced view 609 is generated and presented and includes views of items associated with each of the sub-tags. For example, items 631, 633, 635, and 636 are associated with sub-tag C-A; items 632 and 634 are associated with sub-tag C-B; and items 637 and 638 are associated with sub-tag C-C. Display space is allocated to each group of items associated with each tag roughly proportional to each group's share of the total number of items in enhanced view 609.

Referring back to FIGS. 4 and 6, mobile phone 401 and tablet device 601 may each include additional elements not illustrated herein for purposes of clarity and brevity. Mobile phone 401 and table device 601 may each be representative of any computing apparatus, system, or systems on which gallery scenarios 400, 500, 600, and 600, or variations thereof, may be suitably implemented. Mobile phone 401 and tablet device 601 may each include a processing system, a storage system, software, a communication interface, and a user interface. The processing system may be operatively coupled with the storage system, the communication interface, and the user interface. The processing system loads and executes the software from the storage system. When executed by the processing system, the software directs mobile phone 401 or tablet communication device 601 to operate as described herein for gallery scenarios 400, 500, 600, and 700, or variations thereof.

The processing system implemented in mobile phone 401 or tablet device 601 may comprise a microprocessor and other circuitry that retrieves and executes software from the storage system. The processing system may be implemented within a single processing device but may also be distributed across multiple processing devices or sub-systems that cooperate in executing program instructions. Examples of processing systems include general purpose central processing units, application specific processors, and logic devices, as well as any other type of processing device, combinations, or variations thereof.

The storage system may comprise any computer readable media or storage media readable by the processing system and capable of storing software. The storage system may include volatile and nonvolatile, removable and non-removable media implemented in any method or technology for storage of information, such as computer readable instructions, data structures, program modules, or other data. The storage system may be implemented as a single storage device but may also be implemented across multiple storage devices or sub-systems co-located or distributed relative to each other. The storage system may comprise additional elements, such as a controller, capable of communicating with the processing system, or communication media over which the software may be communicated. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

The software may be implemented in program instructions and among other functions may, when executed by the processing system, direct the processing system to present an initial view of at least a plurality of tagged items arranged in a plurality of tag groups, corresponding to a plurality of tags, based on with which of the plurality of tags each of the plurality of tagged items is associated, identify an enhanced plurality of tagged items to present based at least in part on to which of the plurality of tags a tag group, identified from the plurality of tag groups for enhanced viewing, corresponds, and present an enhanced view of at least the enhanced plurality of tagged items. The software may include additional processes, programs, or components, such as operating system software or other application software. The software may also comprise firmware or some other form of machine-readable processing instructions executable by the processing system. In general, the software may, when loaded into the processing system and executed, transform mobile phone 401 or tablet device 601 overall from a general-purpose computing system into a special-purpose computing system customized to facilitate gallery views as described herein for each implementation.

The communication interface may include communication connections and devices that allow for communication between mobile phone 401 or tablet device 601 and other computing systems (not shown) or services over a communication network or collection of networks. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

The user interface may include a voice input device, a touch input device for receiving a gesture from a user, a motion input device for detecting non-touch gestures and other motions by a user, and other comparable input devices and associated processing elements capable of receiving user input from a user. Output devices such display 405 and display 605, speakers, haptic devices, and other types of output devices may also be included in the user interface. The aforementioned user input devices are well known in the art and need not be discussed at length here. The user interface may also include associated user interface software executable by the processing system in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more computer readable storage media having program instructions stored thereon for facilitating views in a gallery that, when executed by a computing system, direct the computing system to at least:
   present an initial view of at least a plurality of tagged items arranged in a plurality of tag groups, corresponding to a plurality of tags, based on with which of the plurality of tags each of the plurality of tagged items is associated;
   identify an enhanced plurality of tagged items to present based at least in part on to which of the plurality of tags a tag group, identified from the plurality of tag groups for enhanced viewing, corresponds; and
   present an enhanced view of at least the enhanced plurality of tagged items;
   wherein the initial view comprises a plurality of rows corresponding to the plurality of groups and the enhanced view comprises one row shifted horizontally to bring at least one of the enhanced plurality of tagged items into view.

2. The one or more computer readable storage media of claim 1 wherein the program instructions, when executed by the computing system, further direct the computing system to process input information corresponding to a user input to identify the tag group.

3. The one or more computer readable storage media of claim 2 wherein the plurality of tagged items occupy the plurality of rows based on with which of the plurality of tags each of the plurality of tagged items is associated.

4. The one or more computer readable storage media of claim 3 wherein the program instructions when executed by the computing system further direct the computing system to replace the initial view with the enhanced view in response to the user input.

5. The one or more computer readable storage media of claim 4 wherein the user input comprises a touch gesture corresponding to one of the plurality of rows.

6. The one or more computer readable storage media of claim 3 wherein at least the one of the enhanced plurality of tagged items is more visible in the enhanced view than in the initial view, wherein the user input comprises a swipe gesture corresponding to the one row of the plurality of rows.

7. The one or more computer readable storage media of claim 1 wherein the gallery comprises a photo gallery.

8. A method for facilitating views in a gallery comprising:
   presenting an initial view of at least a plurality of tagged items arranged in a plurality of tag groups, corresponding to a plurality of tags, based on with which of the plurality of tags each of the plurality of tagged items is associated;
   identifying an enhanced plurality of tagged items to present based at least in part on to which of the plurality of tags a tag group, identified from the plurality of tag groups for enhanced viewing, corresponds; and
   presenting an enhanced view of at least the enhanced plurality of tagged items;
   wherein the initial view comprises a plurality of rows corresponding to the plurality of groups and the enhanced view comprises one row shifted horizontally to bring at least one of the enhanced plurality of tagged items into view.

9. The method of claim 8 further comprising processing input information corresponding to a user input to identify the tag group.

10. The method of claim 9 wherein the plurality of tagged items occupy the plurality of rows based on with which of the plurality of tags each of the plurality of tagged items is associated.

11. The method of claim 10 further comprising replacing the initial view with the enhanced view in response to the user input.

12. The method of claim 11 wherein the user input comprises a touch gesture corresponding to the one of the plurality of rows.

13. The method of claim 10 wherein at least the one of the enhanced plurality of tagged items is more visible in the enhanced view than in the initial view, wherein the user input comprises a swipe gesture corresponding to the one row of the plurality of rows.

14. The method of claim 8 wherein the gallery comprises a photo gallery.

15. A computing apparatus comprising:
   a computer readable storage media;
   a gallery application comprising program instructions stored on the computer readable storage media that, when executed by a processing system, direct the processing system to at least:
   present an initial view of at least a plurality of tagged photos arranged in a plurality of rows based on a plurality of associations between the plurality of tagged photos and a plurality of tags corresponding to the plurality of rows; and
   in response to a user input, present an enhanced view of an enhanced plurality of tagged photos corresponding to a tag selected from the plurality of tags;
   wherein the enhanced view comprises one row shifted horizontally to bring at least one of the enhanced plurality of tagged items into view.

16. The computing apparatus of claim 15 wherein the program instructions, when executed by the processing system, direct the processing system to initiate replacing the initial view with the enhanced view in response to the user input.

17. The computing apparatus of claim 16 wherein the user input comprises a touch gesture corresponding to the tag.

18. The computing apparatus of claim 17 wherein at least the one of the enhanced plurality of tagged items is more visible in the enhanced view than in the initial view.

19. The computing apparatus of claim 18 wherein the user input comprises a swipe gesture corresponding to one row of the plurality of rows.

20. The computing apparatus of claim 15 further comprising the processing system configured to execute the program instructions.

* * * * *